Figure 5:
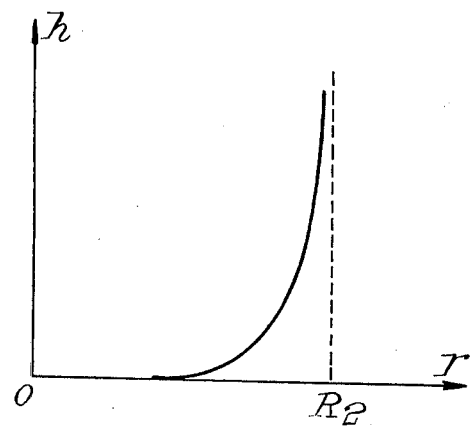

United States Patent [19]
Renard et al.

[11] 3,904,901
[45] Sept. 9, 1975

[54] ROTARY ELECTRIC MACHINE WITH SUPER-CONDUCTING WINDING

[75] Inventors: Michael Claude Albert Renard, Grenoble; Alain Mailfert, Morsang-sur-Orge, both of France

[73] Assignee: Agence Nationale de Valorisation de la Recherche (ANVAR), Neuilly-sur-Seine, France

[22] Filed: Nov. 2, 1973

[21] Appl. No.: 412,127

[30] Foreign Application Priority Data
Nov. 3, 1972 France .............................. 72.38967
July 3, 1973 France .............................. 73.24394

[52] U.S. Cl. .................................. 310/52; 310/54
[51] Int. Cl.² .............................................. H02K 9/00
[58] Field of Search ............... 310/10, 40, 52, 54–65

[56] References Cited
UNITED STATES PATENTS

| | | | |
|---|---|---|---|
| 1,938,077 | 12/1933 | Lysholm | 310/54 |
| 3,242,418 | 3/1966 | Mela et al. | 310/52 X |
| 3,657,580 | 4/1972 | Doyle | 310/52 |
| 3,679,920 | 7/1972 | MacNab et al. | 310/52 X |
| 3,742,265 | 6/1973 | Smith, Jr. | 310/52 |
| 3,745,389 | 7/1973 | Lorch | 310/52 |
| 3,764,835 | 10/1973 | Luck et al. | 310/52 |
| 3,772,543 | 11/1973 | Woodson | 310/52 |

*Primary Examiner*—Donovan F. Duggan
*Attorney, Agent, or Firm*—Larson, Taylor and Hinds

[57] ABSTRACT

An asynchronous rotary electric machine comprises a stator in which a field coil or inductor of superconducting material rotates. The field coil is in a cryostat rotating with it and has a purely electromagnetic coupling with an electrically conducting and amagnetic rotary assembly comprising a transmission shaft which delivers or receives mechanical power. The rotary assembly may be tubular and contains the cryostat and the field coil.

25 Claims, 10 Drawing Figures

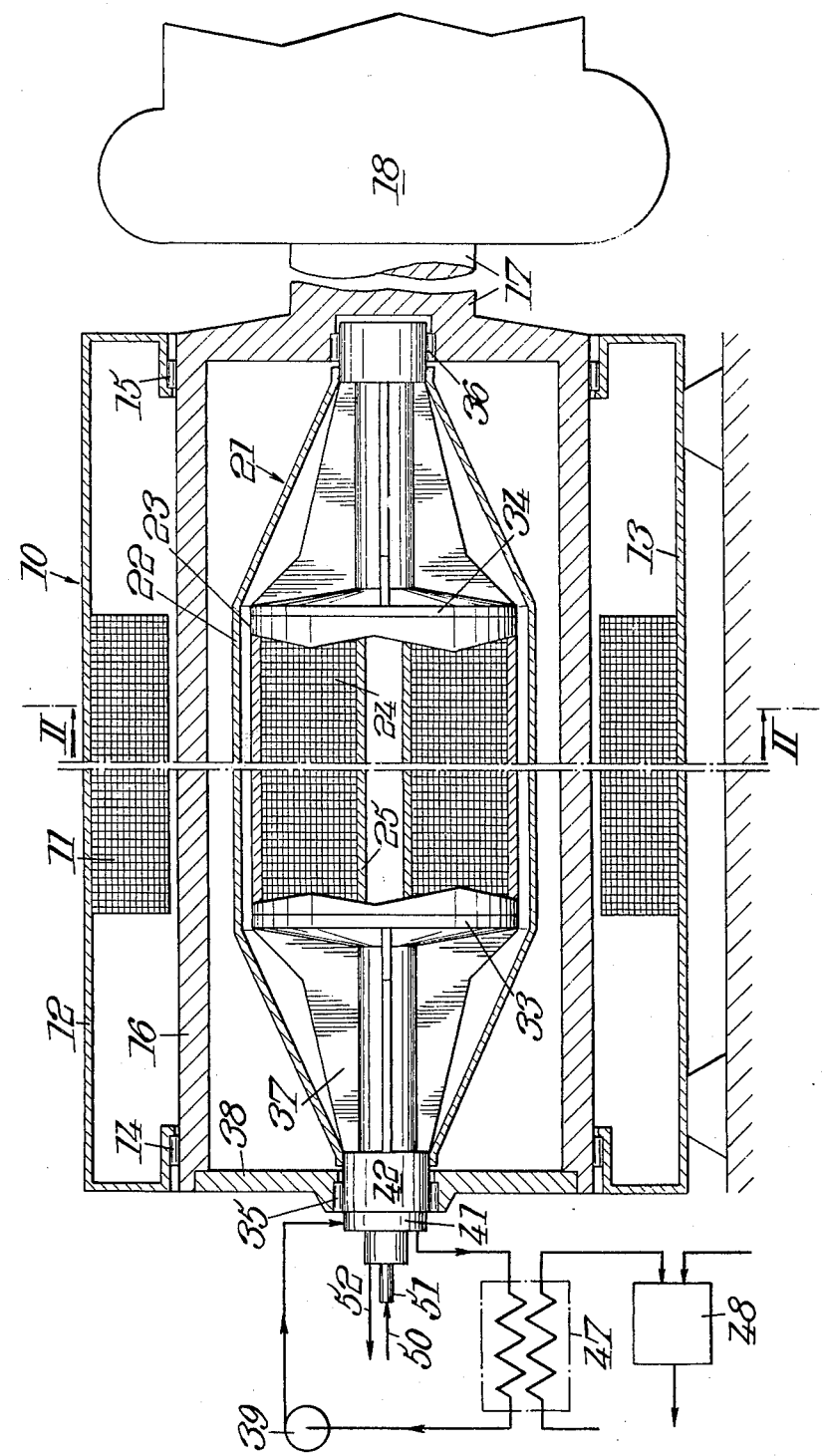

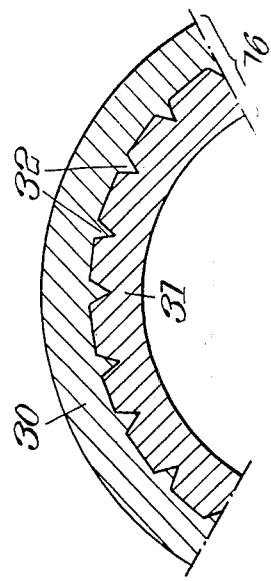
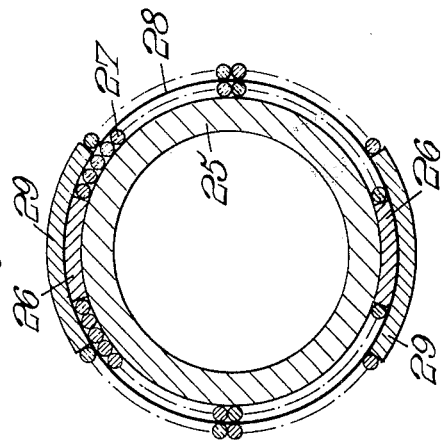
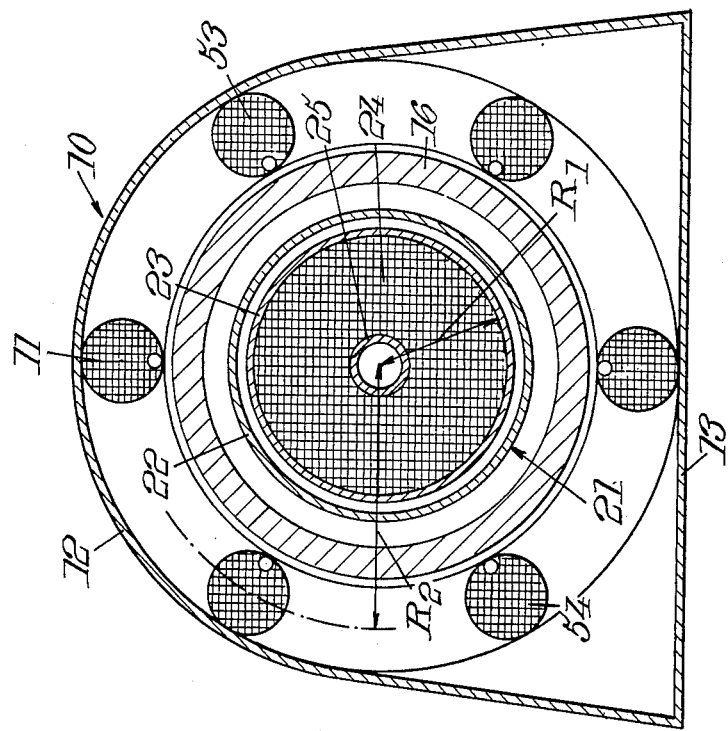

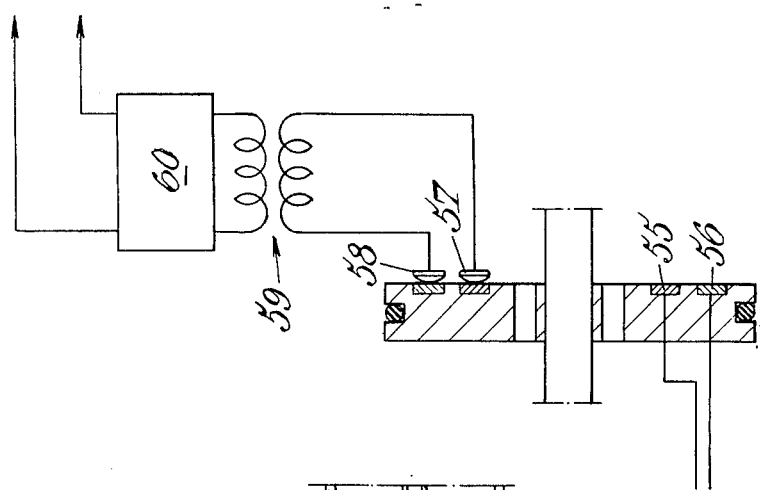
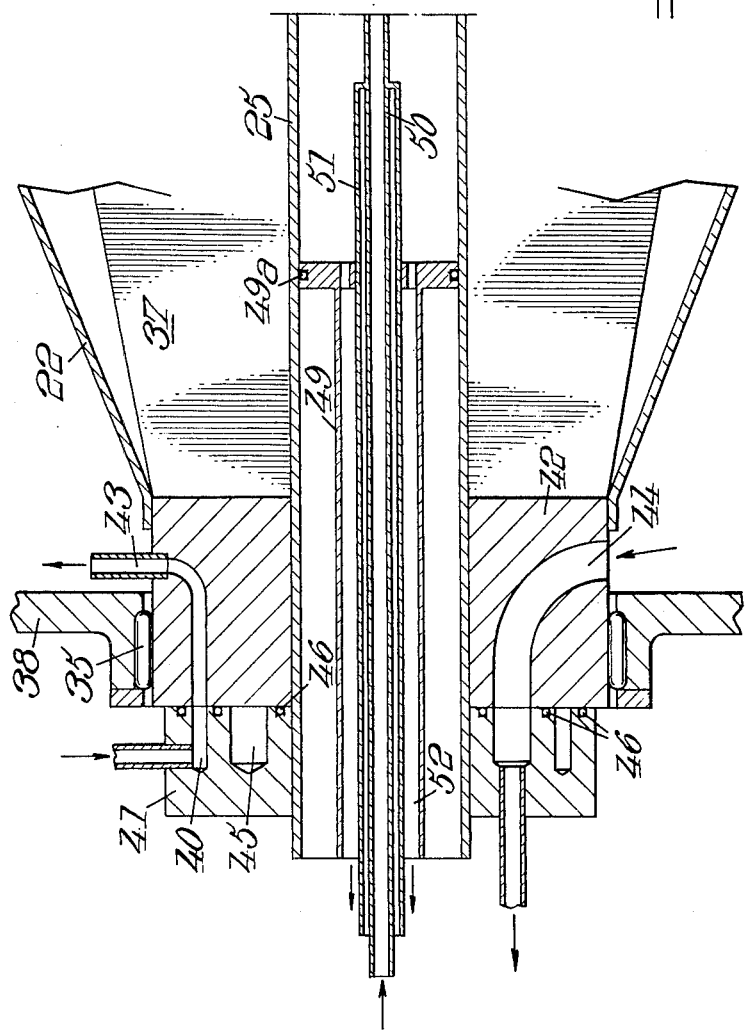

ROTARY ELECTRIC MACHINE WITH SUPER-CONDUCTING WINDING

The present invention relates to alternating current asynchronous electric machines and, more particularly but not exclusively, machines which are adapted to receive electric power and to deliver mechanical power on a rotating shaft.

The use of superconductors for constituting some at least of the windings of a rotating electric machine has already been proposed. Such use appears most advantageous when such windings are subjected to magnetic fields which are constant or whose variation is quite slow. This is since very high electric currents may circulated in such superconductors with very low losses and correlatively the volume may be kept to a minimum for a predetermined power. As a counterpart, the use of superconductors makes it necessary that the windings be maintained at cryogenic temperatures. Moreover, it should be borne in mind that electrical windings which are subjected to magnetic fields which are variable (for instance the armature windings of an asynchronous machine or the armature and field windings of conventional electrical machines), since superconductors have a marked magnetic hysteresis. Such hysteresis would result in production of heat which is not compatible with the low temperatures at which superconductivity occurs.

Now, if an attempt is made to constitute the rotating field winding of a synchronous machine with superconductors, the direct mechanical coupling between the rotating assembly and the prime mover (if the machine is an alternator) of the driven apparatus (if the machine is a motor) constitutes a thermal path which results in the need for a delivery of frigories which is excessive.

SUMMARY OF THE INVENTION

It is an object of the invention to provide a rotating electric machine whose field windings consist of superconductors and which overcome the deficiencies of the prior superconducting machines.

It is another object of the invention to reduce the thermal flow from the field winding at cryogenic temperature by suppressing mechanical coupling between the rotating assembly and a shaft which drives or is driven by the rotating assembly.

According to the invention, the electric machine comprises a stator having an armature winding, a superconducting field coil, rotatably mounted in the stator together with a cryostat accomodating the field winding, and an electrically conductive amagnetic rotating assembly which has a purely electrical magnetic coupling with said field winding and which comprises a transmission shaft which delivers or receives mechanical power.

According to an embodiment of the invention, the shaft is of tubular shape, is located within the stator and around the cryostat and field winding.

In a first embodiment of the invention, the rotating assembly consists of an electrically conducting shaft of tubular shape, when excessively high electrical currents circulate in the shaft. As a consequence, the shaft should be cooled. This may be done for instance by a closed cooling circuit which delivers demineralized water into the shaft. The water is thrown along the inner wall of the shaft by the centrifugal force. The steam or the steam-water mixture is evacuated, condensed and returned to the shaft.

According to another embodiment of the invention, the rotating assembly comprises a polyphase winding carried by the shaft connected to sliding electrical connecting means through which the electrical energy may be drawn from the winding or injected into the winding to or from the outside, making it possible to adjust the speed when the machine is used as a motor. In that embodiment, while electrical operation of the machine is synchronous, an adjustable speed of the shaft may be attained.

SHORT DESCRIPTION OF THE DRAWINGS

Figure 6:
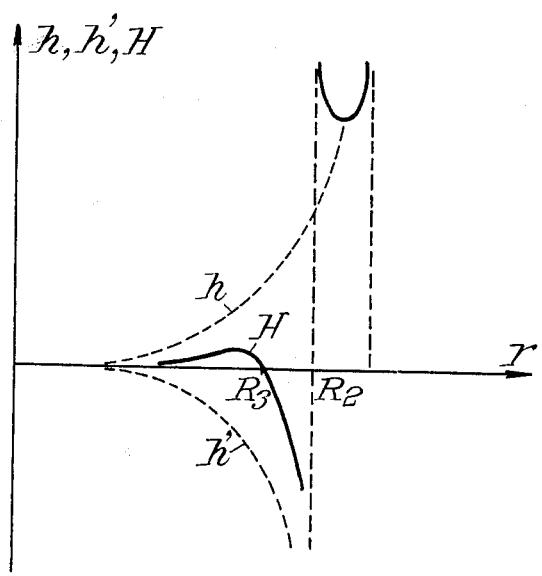
Figure 9:
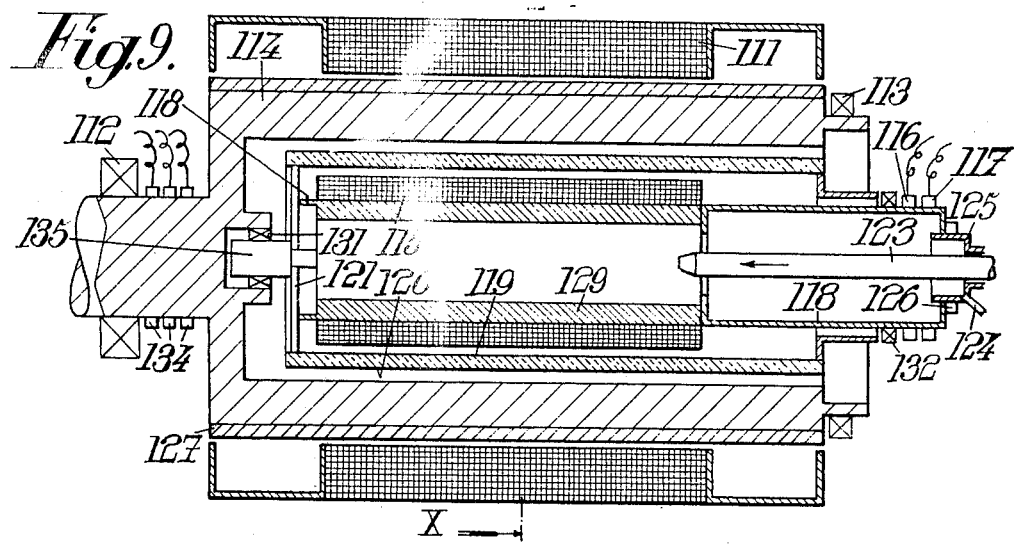
Figure 10:
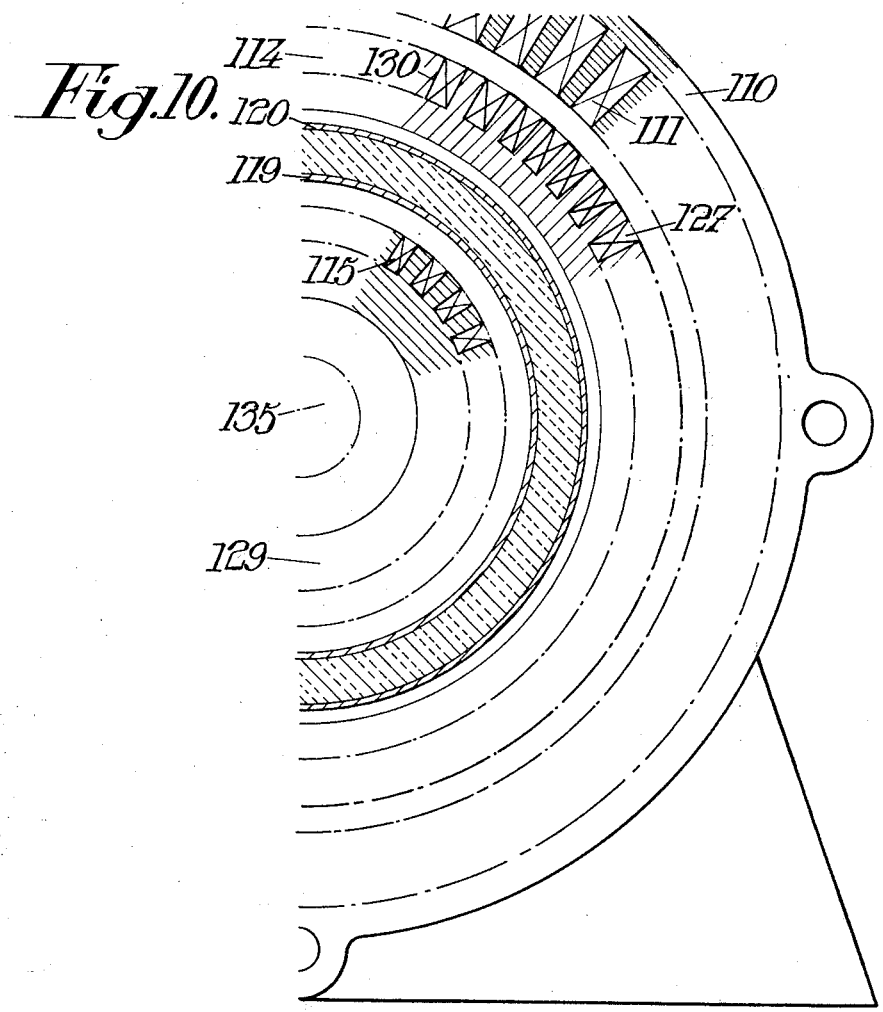

The invention will be better understood from the following description of preferred embodiments given by way of non-limitative examples. The description refers to the accompanying drawings wherein:

FIG. 1 is a simplified representation of a generator according to the invention, in cross-section along a vertical axial plane, FIG. 2 is a view along line II—II of FIG. 1, FIG. 3 is a diagrammatic representation of a part of the shaft, the thickness being amplified for more clarity, FIG. 4 is a diagrammatic representation of the first layers of the field winding, FIGS. 5 and 6 are curves which illustrate the variations of the harmonic field as a function of the distance from the axis, FIG. 7 shows the end arrangement of the cryostat and of the surrounding components, in cross-section along an axial plane, FIG. 8 is a circuit diagram of the system for passing current in the field winding, FIG. 9 is a diagrammatic representation of a three phase bipolar asynchronous electric motor according to another embodiment of the invention, in cross-section along an axial plane, FIG. 10 is a schematic view in cross-section along line X—X of FIG. 9.

Referring first to FIGS. 1 and 2, there is shown an alternating current generator having a stationary frame which carries an armature winding 11 and which rotatably supports rotating assemblies. The frame of the generator shown in FIG. 1 comprises a half-cylindrical shell 12 closed by an end wall 13 and a ring formed with openings for the armature winding 11. The armature winding may be of any known design and be retained by electrically insulating wedges (not shown) which take mechanical forces in operation. The armature winding shown in FIGS. 1 and 2 is however of a particular type. It does not include a ferro-magnetic support which would be useless, since the very high inductions within the material would saturate it completely. In addition, the stator or armature material cannot be made of superconductive material since it is subjected to a large alternating magnetic field and the superconductors have a magnetic hysteresis large enough for resulting in losses and heat formation which would make it impossible to retain the critical temperature. The axial length of the stator winding will generally high as compared with the diameter, particularly in a large alternating current generator.

Two bearings 14 and 15 are carried by the end portions of the frame for supporting a rotating hollow shaft 16. The bearings should be located at a distance from the stator winding and from the rotating direct current field winding (which will be described later) for the magnetic flux through it to remain low and not to result in heavy losses.

The rotating assembly comprises the hollow shaft 16 and a composite system consisting of the field winding and the cryostat or Dewar which locates it. In the embodiment of FIGS. 1 and 2, the passage in shaft 16 is blind and the shaft is formed with a cylindrical projection 17 for coupling with a prime mover such as a turbine 18. In order that the shaft be able to support the stresses in operation, it will generally have to be stamped and solid. On the other hand, the field winding may has a relatively small diameter, since it is superconductive. As a consequence, the shaft may have a relatively low diameter, which renders manufacture easier. As an example, the diameter of the shaft may be as low as one meter for a 1000 VA generator. In FIGS. 1 and 2, the thicknesses have been illustrated with an enlarged scale for more clarity. The large diameter bearings 14 and 15 will generally consist of roller or needle bearings.

The composite system consisting of the cryostat and field winding 21 is rotatably supported by two bearings 35 and 36 carried by the shaft. It is important to note that the differential speed between the field winding and the shaft will always remain small, except during starting up, since it corresponds to the rotational shift necessary for the winding to be driven by the shaft.

The composite system 21 of FIGS. 1 and 2 comprises a cryostat which rotates synchronously with winding 24 is subjected to the flux variations of the shaft reaction field, which varies (with respect to the superconductive winding) only during the transitory movements, when the shift is altered. The cryostat may consequently be made of conventional materials, for instance with metals. It should however fulfill two conditions: first, it should be adapted to resist the centrifugal force. Second, it should be quite exactly centered with respect to the rotating axis of the hollow shaft 16.

The cryostat enclosure comprises an outer envelope, constituted by an outer wall 22 and a thick inner wall 23, serving as a hoop for the superconducting winding. This wall 23, at the temperature of a superconductivity and supporting the weight of the winding 24, is connected to the rotation bearings by parts of low thermal conductivity, as will be seen below. The space between the walls is kept under vacuum to ensure as high an insulation as possible. This vacuum can be produced once and for all, the enclosure then being sealed. Moreover, the walls can be silvered to reduce radiation.

The field coil 24, illustrated in part in FIG. 4, is carried by a support tube 25. It is only subjected in operation to the centrifugal force and to the electrical and electromagnetic stresses connected with the current which traverses it. These stresses are, on one hand, supported by the inner envelope 23 forming a hoop, it can also as illustrated in FIG. 4 form intermediate hoops. Again in the embodiment illustrated, there are placed on the central tube 25, of magnetic material shims 26 (two shims in the case of a bipolar winding). These two shims 26, of insulating material, extend along two diametrically opposite zones of the tube 25. Around them are wound several layers of superconducting material (only one 27 being shown in FIG. 4 for more clarity) until a thickness is obtained corresponding to that of the shims 26. Then, a layer of insulating plastics material, pierced with holes, is placed on the layers thus wound and the assembly is bound by means of a helicoidal winding of wire of a material having the same coefficient of thermal expansion as that which constitutes the tube 25. Advantageously steel wire 28 is used and a tube 25 of steel of the same type to obtain high resistance.

On a layer of wire 28, shims 29 are placed having an angular extent greater than that of the shims 26 and the superconducting wire is again wound in the form of longitudinal turns, each turn framing one of the shims 29. Thus a diameter is reached which corresponds to the inner diameter of the envelope 22.

There is thus obtained a pseudo-bipolar distribution by using shims of variable pitch to limit successive layers of superconductor. This structure only provides a reduced solidity with respect to mechanical torques but it is possible because there is no high mechanical torque in this winding.

This inner envelope is completed by two flanges 33 and 34.

As has been seen above, it is necessary to place the bearings as far as possible from the intense magnetic field which exists close to the winding 24 and the stator winding 11. This implies a large distance between the flanges 33 and 34 and the bearings which support the rotary assembly. To give this assembly the necessary rigidity, whilst preserving as low a thermal conduction as possible, the inner envelope 23 is advantageously connected to the tube 25 and to the inner rings of the bearings 35 and 36 by ribbed parts of generally conical shape. The bearing 36 is placed in a hollow formed at the bottom of the hollow shaft 16. The other bearing 35 is mounted in a disc 38 closing the hollow shaft. The two bearings, which —except for transients— are only subjected to slippage, can be constituted by needle bearings.

The middle part of the tube 25 constitutes the inner envelope of the cryostat and it is, like the ribs and the inner wall 23, of stainless steel with a low thermal conductivity.

The shaft 16 must on one hand have a high mechanical strength, on the other hand must only have low resistance to the path of the flow of the high currents required for driving the field coil 24. This result can be achieved by means of various constructions.

In the embodiment illustrated in FIG. 3, the shaft 16 is constituted, at least in its tubular portion, by an outer layer 30 of a magnetic steel of high shear strength, (for example, stainless steel 18.8), on which is plated a layer 31 of copper or of aluminium of high purity. The poor mechanical behaviour of pure good conductive metals is thus compensated by the high mechanical strength of steel. The steel is preferably placed inside the shaft to facilitate cooling, as will be seen below.

To solidarize the layers 30 and 31, the steel layer is provided with grooves 32 over the whole of its length to drive the copper or aluminum in rotation. These grooves can have a very slight projection (5 to 15% of the thickness of steel).

The optimal thickness of the copper or aluminum layer 31 is a function of the radius $R_1$ and of the number of poles of the coil 24. If this coil is bipolar, the optimum power is obtained for a thickness which, for an alternator of high power, is generally of the order of $R_1 \times 0.3$, but this figure is only indicative, since one can for example increase this thickness to improve the yield by losing a little in power, or reciprocally, if it is desired above all to have a high specific power. In practice, it may be considered that the thickness will remain comprised between $0.2 \times R_1$ and $0.35\, R_1$ for all power alternators.

Another solution (not shown in the drawings) consists of constituting the hollow shaft 16 of light alloy based on aluminum or zirconium (of the "duralumin" or "zircaloy" type for example). Although the resistivity of these alloys is greater than that of pure copper or of pure aluminum, it remains still acceptable and the shear strength is sufficient for powers not exceeding 600 MVA. The optimal thickness is multiplied by the ratio of the resistivities, in comparison with the previous solution. This solution has the advantage of simplicity.

Finally, for very high powers there may be used a composite hollow shaft, but with an inner plating of alloy of greater mechanical strength than that of copper, for example of alloy based on aluminium or zirconium.

The currents in the hollow shaft 16, which create the drive torque by their interaction with the superconducting coil, must be as high as possible. Their intensity is an increasing function of the slippage, and the latter always remains sufficiently low not to constitute a limitation. The latter is due to heating of the shaft, which must be vigorously cooled by a circuit enabling the removal of the heat dissipated by the currents of several thousand amperes per centimeter of circumference by keeping the shaft at a temperature not exceeding 100° to 150°C.

In the particular embodiment illustrated in FIGS. 1 and 7, this circuit is provided to cool the shaft 16 by a film of boiling water kept in contact with the inner surface of the shaft by centrifugal force. This solution is rendered possible by the fact that the differences of potential along the shaft are slight, which eliminates problems of electrolysis. In a particular case which can be considered as typical, where the power exchanged is of the order of 100 W/cm², and where the intensity per centimeter of periphery is about 17,000 amperes for a thickness of aluminum of 10 cm, the difference of potential is about 0.5 volts per meter.

The cooling circuit of the shaft illustrated in FIGS. 1 and 7 comprises, outside the alternator, a pump 39 which supplies with water, demineralized in order to avoid any scaling, an annular chamber 40 formed in the surface of a fixed distributor 41 which is facing a hub 42 bearing the inner bearing ring 35. In this hub is formed a passage 43 which opens close to the disk 38. This passage can be oriented so as to operate as a scoop when the cryostat-winding assembly turns and to throw water onto the wall of the shaft 16.

The phases are automatically separated due to the fact of the turbulent movement of the water. The vapor is collected by a duct of large cross-section 44 formed in the hub and which opens into an annular chamber 45 of the distributor. Sliding toric joints 46 limit the leakages between the distributor and the hub.

The steam collected is condensed and returned to the pump. The heat is advantageously recovered in an exchanger 47 through which a fraction of the flow passes going to the boiler 48 supplying the turbine. This exchanger, which hence operates as an economizer, enables (with present thermal cycles) the thermal cost of the losses to be multiplied by about 0.6.

Despite ohmic losses in the shaft 16, the thermal balance is much more favorable than in an alternator with a superconductor where the shaft would drive the field winding directly, since the frigorific power necessary to keep the winding 24 cold, due to the fact of the elimination of all mechanical transmission by low temperature members, is divided by a factor of the order of $10^4$.

The liquid helium supply circuit is placed in the distributor 41 and the hub 42. The gaseous helium is collected in the middle part of the tube 25 pierced with holes and returned outside by a fixed duct 49 ended by a collar provided with a sliding joint 49a. Insulating cross members not shown hold in the duct 49 an intake tube 50 provided with a sheath 51 in which an insulating vacuum exists. The tube 50 throws the liquid helium in line with the slots of the tube 25 and the centrifugal force throws it outwardly, that is to say towards the windings, when the assembly turns. The separation of the liquid and the gaseous phases is thus effected automatically. The liquid helium is brought to the duct 50 by a supply installation not shown and taken up in the duct 49 by a tube 52 (FIG. 1) after vaporisation.

The stator winding 11 is subject to a very high flux. The conductors constituting this winding must consequently be divided, or in other words, each elemental conductor must have a diameter very much less than the skin depth: in practice, the diameter must be 0.5 to 3 millimeters. If this wire were used in series, the voltage at the terminals of the alternator would be several MV, hence very excessive. Also it is necessary to use them in parallel, by transposing the conductors. A particularly simple solution consists of twisting together seven electrically insulated elemental wires, so that the sectional flow is equal in the seven wires and there are no flow currents, then to twist together seven elemental strands, thus obtaining a conductor comprising 49 elemental conductors, which are connected at their end by welding, and which hence operate in parallel. This example is given purely by way of indication and any compact stranding solution where the wires are twisted into a helix so as to ensure transposition is equally acceptable.

Moreover, it must be pointed out that the space offered to the conductor is much greater since it is not limited to notches and the total current can be higher with a constant current density.

The winding of the stator according to the invention, is advantageously constituted in cylindrical form, the centers of two cylinders constituting one phase, 53 and 54 for example, being arranged, around the hollow shaft, so as to cut all the flux of one pole of the superconducting winding; for example, as illustrated in FIG. 2, they are symmetrical with respect to the axis of rotation in the case of a bipolar superconductive winding.

A three phase winding thus constituted, traversed by balanced three phase currents, gives on its axis a field rotating at the frequency of the current called "induced reaction". When the alternator supplies active power, it is this field which exerts on the superconducting coil a strong torque and equilibrium is reached when this torque is equal to the drive torque produced by the layers of current borne by the hollow shaft. But in moving away from the center, to this field, fixed in the rotary system, is added a rotary field $h$ at triple the frequency of the fundamental. If by $R_2$ is denoted the radius of the circle bearing the centers of the cylinders constituting the stator windings, this field $h$ with triple frequency varies with the distance $r$ to the axis, from O to $R_2$, as illustrated in FIG. 5, that is to say much more quickly than the sectional flux by a conductor of radius r: this particularity enables the arrangement, very close to the hollow shaft 16, of a conductor (not shown) in series with the remainder of the winding constituting each of the phases, but traversed by a current in reverse direction and giving a field $h'$.

The amplitude of each of the fields $h$ and $h'$ with triple the frequency of the current supplied, varies then as a function or $r$ as shown in FIG. 6 where the scale of the amplitudes is greater than that of FIG. 5. The position of the single conductor in opposition, can be calculated, for which the sum H of the two third harmonic fields is nil for a radius $R_3$ corresponding to a depth in the hollow shaft 16, equal to half the skin depth at the harmonic frequency for the conductor involved in the hollow shaft. This feature, if it is manifested by a loss — slight besides — of specific power, improves on the other hand the yield by reduction of the interfering currents induced in the hollow shaft 16. This single conductor added to each cylinder will be placed between the cylinder and the rotary shaft, in the plane joining the axis of the alternator to that of the cylinder.

Instead of the feature which has just been described, there can be used that illustrated diagrammatically in FIG. 2. It consists of constituting a cylinder not comprising a conductor in a small space close to the shaft. The winding cylinder would then be equivalent to the association of a whole cylinder of conductors in series with a cylinder of contrary effect situated inside and of much smaller size. This solution has with respect to the preceding one the advantage of being a little simpler.

Whatever the arrangement adopted, it is possible, by suitable arrangement of stator winding conductors, to obtain an output voltage much higher, than in an alternator using a normal rotor, and in particular to reach a voltage which makes it unnecessary to interpose a step-up transformer between the alternator and the transport network. For example, for an alternator 4.5 m long, there can easily be obtained a voltage for each stator "turn" of about 1000 volts and each turn is easy to insulate from the following one. There then suffice 500 conductors in series to obtain the voltage of 500 kV which is actual transport network.

On the other hand, it is clear indeed that this choice of a high output voltage imposes a particular insulation technology, the latter having to be especially efficient. The stator having besides to be cooled, it will be necessary to ensure this cooling by a dielectric fluid, such as pyralene, if a liquid is selected, or hydrogen, if a gas is chosen.

The huge rotary magnetic multipole which constitutes the field coil 24 (bipole in the case which has just been described) creates an intense rotary magnetic field. In spite of special precautions, this field would be troublesome at distances reaching several tens of meters, although its intensity diminishes proportionally to the third power of the distance. To short circuit the magnetic flux which emerges from the alternator, there is advantageously provided a ferromagnetic screen or conductor serving as extinction means by induced currents. This screen, which can be of ferro sheet metal material, a layer ferrite or a sheet of a good electrically conductive metal, will generally, be placed at a distance from the axis or the alternator equal to five times at least the radius of the superconducting coil 24. This screen can be constituted by a metallic floor situated widely above the alternator and extending laterally by partitions. It can for example, be an aluminum sheet of 2 cm thickness. This solution is inexpensive, since a power site station comprises always a control room which will then be placed on the floor. The minimum distance of five times the radius does not represent a restriction, since in any case, the height below the ceiling of the hall of the machines must be sufficient to enable the uncapping of the alternator and of its turbine or of its drive turbines.

The operation of the alternator being apparent from the foregoing description, it will only be indicated here summarily. When the rotary shaft turns, driven by the turbine, the superconducting winding working in the liquid helium has a nil resistance and behaves like a pure self-inductance. Hence it traps a constant magnetic flux and even the reactive portion (hence demagnetizing) of the field of the induced reaction can only increase the current in the field coil, the latter being assumed short-circuited. Centrifugal force tends to recirculate the liquid helium towards the coil from the central input tube and guarantees its maintenance cold. An auxiliary device must however be provided to initiate the operation of the alternator on starting up of the latter. When in fact the cryostat-coil assembly is at rest, there is no centrifugal force and the winding is not, at least in its major part, at the superconductivity temperature. This winding is however capable of withstanding a current of several amperes, since superconducting alloy wires or tapes are always covered with a copper deposit.

To provide the winding with the necessary current for energization and to start up the rise in the magnetic field during the starting up period, a supply from the outside must be provided. It can obviously be envisaged to supply the winding directly by means of sliding contacts (with rings and brushes) placed in the central tube. This solution has a serious drawback, since present superconducting windings require high currents reaching 500 amperes. It is consequently preferable to adopt the solution shown diagrammatically in FIG. 8. It consists of supplying friction tracks 55-56 borne by a fixed member situated in the tube 25, for example the terminal collar of the duct 49, with alternating current at relatively high voltage. The power remaining low, (of the order of 100 watts), it is seen that the use of a voltage of the order of 100 volts enables a reduction in the current to a value of the order of 1 ampere. The current, taken by means of brushes 57 – 58, supplies a voltage dropping transformer 59. A rectifier 60 (semiconducting diode bridge for example) then enables the coil to be supplied. This supply can be completed by a superconducting switch with centrifugal control which closes the coil on itself when a predetermined speed is reached, which speed corresponds to superconductive regime operation.

The motor illustrated in FIGS. 9 and 10 comprises a double rotary plant, of generally cylindrical shape, which comprises disposed coaxially, from the axis of the machine, the field coil or inductor 115 contained in a cryostat, a passive screen of good electrically conducting material, fast to the outer wall of the cryostat then the hollow shaft 114 which supplies the mechanical power and bears a polyphased rotor winding. There could also be adopted other arrangements which seem however less satisfactory, for example the use of a solid shaft instead of a hollow shaft and the placing of the assembly of coils and the passive screen around the shaft.

The general construction of the asynchronous motor illustrated in FIG. 9 is close to that of the machine shown in FIGS. 1 to 8. It differs therefrom however profoundly by the presence of a rotor polyphase winding, borne by the hollow shaft and supplied from the outside.

As will be seen below, the motor comprises a fixed frame 110 (FIG. 10) which bears a stator winding 111 and in which is mounted the double rotary apparatus. The polyphase stator winding 111 is connected for example to a production network of electrical energy through conventional cut-off members. It is constituted of a good electrically conducting material, copper or aluminum for example, operating at the normal temperatures of coils of conventional electric motors.

The frame 110 carries at its ends centering bearings 112 and 113 for the rotary hollow shaft 114. These bearings are sufficiently spaced from the stator winding and from the windings of the rotary assembly for the magnetic flux which passes through them to remain low.

On operation, the rotating magnetic field produced by the stator winding 111 rotates the inductor 115 at the synchronising frequency, and the hollow shaft 114 at a frequency which is less than the synchronising frequency if the rotor winding can deliver power (for example into rheostats outside the machine) or above synchronism (if the external supplies providing it with power in the form of currents and polyphase voltages of judiciously selected frequency).

The hollow shaft 114 comprises, in its inner cavity, a centering bearing 131 in which the inductor 115 placed in its rheostat rotates. A second support bearing 132 for the inductor can be placed inside the hollow shaft, at the open end of the cavity, or directly on the fixed frame, the latter case being that illustrated in FIG. 10.

The superconductive inductor winding 115, bipolar in the embodiment described, is traversed by the continuous energizing current of the machine, constant at steady rate. This inductor winding 115 is produced according to customary technology for superconductive magnets, so that it is not necessary to describe here its construction in detail. The superconducting material can be for example of the multifilament composite type associating elemental filaments of a niobium alloy and titanium burried in a copper matrix and in the form of wires with circular or rectangular cross-section. The various elemental conductors suitably insulated are arranged, in a sufficient number to ensure overall distribution of current resulting in a bi-polar field, for example in grooves or notches formed at the periphery of a cylindrical mandrel 129. This mandrel 129 (FIG. 10) can be of steel (magnetic or amagnetic, the inductions being very high), of an insulating material or again of a metal having a good mechanical strength and good conductor of heat. If plastics material is used, the latter is advantageously reinforced with fibers. Among the metallic products usable, light alloys based on aluminum may be cited particularly. The inductor winding 115 and the mandrel which bears it are provided with cooling channels intended to enable a cryogenic fluid to circulate therein.

The inductor winding 115 being subject to magnetic stresses due to its own field and to mechanical stresses due to the centrifugal force on operation, it must be blocked on the mandril 129. This result can be achieved by using notched wedges of material with good mechanical strength, metallic hoops, or again an impregnation of thermo-setting resin. The methods above can obviously be used also in combination.

The inductor winding 115 must be supplied with continuous current, at least during a period of starting up. This supply can be effected by a stub shaft exciter, associated with static rectifiers, or from the outside. It is the second solution which is illustrated by way of example in FIG. 9, which shows the sliding contacts 116 and 117 comprising fixed sliding contacts and rings borne by a jacket 118 connected to the mandril supporting the inductor winding. The conductors (not shown) connecting the sliding contacts to the inductor winding are situated inside the jacket; they must obviously be divised so as to reduce as much as possible the introduction of heat into the low temperature zone.

Whatever the solution adopted for supplying the inductor winding on increasing the operating rate, this winding comprises advantageously a superconductor switch, open on rise in rate and which closes at steady rate so as to loop on itself the inductor winding and trap the flux necessary for operation. At the same time, the supply can be cut off.

The inductor winding is enclosed in a cryostat, comprising an inner wall 119 and an outer wall 120. The inductor winding is fixed to the outer wall 120 of the cryostat through centering parts. These parts comprise, in the embodiment described, two jackets 118 and end elements 121. The outer wall 120 is advantageously constituted of a cylinder of electrically good conducting material, aluminum alloy for example, of sufficient thickness to serve as an electromagnetic screen with respect to the inductor winding.

In fact, as has already been stated, the hysteresis observed in the magnetic behaviour of superconductors makes it necessary to eliminate from the rapid variations in magnetic field. For this reason, superconducting alternators at the present time all comprise an electromagnetic screen which has the function of damping the effects of interfering magnetic fields produced by the armature. In the asynchronous motor illustrated by way of example of the invention, it is the outer wall 120 of the cryostat containing the inductor 115 which fulfills this function.

Between the inner wall 119 and the outer wall 120 of the cryostat is provided a thermal insulation, which can be constituted in conventional manner by a double wall jacket under vacuum, containing a multilayer insulating material, according to the techniques called superinsulation. The inductor shaft 135 and the connecting members between the winding 115 and the outer wall 120 of the cryostat (jackets 118 and end elements 121) must be of small cross-section, and produced for example of stainless steel of low thermal conductivity. These connections can only have a low mechanical strength, no torque being exerted on the inductor 115 at balanced steady rate.

The assembly of the inductor 115 and the cryostat is rigidly fixed to the shaft 135 called inductor shaft, which rotates freely on bearings or rollers 131 and 132 inside the hollow shaft 114 which constitutes the main shaft of the machine. One of the end parts of this inductor shaft 135 is itself tubular, so as to enable supply of the cryostat with cryogenic fluid (liquid or hypercritical helium) and the supply of the superconductor inductor winding with electric current.

In the embodiment illustrated diagrammatically in FIG. 9, the supply means of the cryostat with maintenance fluid at cryogenic temperatures comprise a central tube 123 which opens inside the mandril bearing the inductor winding 115. Through this tube, cryogenic fluid is injected, which can be liquid helium or, better still, supercritical helium. The vaporised helium returns into the space comprised between the tube 123 and the jacket 118 (the latter being advantageously provided with insulation). The helium is removed through a pipe 124 which opens into a fixed collector 125, cooperating with the terminal surface of the jacket through a rotary sealing joint.

The supply of the superconducting winding 115 with electric current is effected by means of rods, bands or tubes of copper connecting the ends of this winding to the sliding contact rings 116 and 117. These rods, bands or tubes of copper are situated in the space comprised between the tube 123 and the jacket 118 to enable efficient cooling of these current inputs by gaseous helium coming from the inside of the cyrostat.

The rotary members which have just been described rotate as a unit. The double rotary mechanism comprises also the principal hollow shaft 114 of the machine and the polyphase rotor winding 127 which it bears. The shaft 114 is selected of a material with a high mechanical strength, of magnetic steel or amagnetic steel generally. This shaft 114 is subject to a magnetic field rotating at the slip frequency of the asynchronous motor; it must be produced accordingly; it will for example be of a material sheeted in a plane perpendicular to the axis of the machine, at least in its portion subjected to the rotary field; this shaft could also be produced of an insulating material with high mechanical characteristics, which avoids the need to sheet it. The shaft could be provided with radial slots 130 open towards the outside enabling the windings constituting the polyphase rotor coil 127 to be positioned. For greater simplicity, some notches only are shown in FIG. 10.

The bipolar three phase rotor winding 127 can be produced according to conventional winding techniques for asynchronous motor rotors. The winding has to be kept at a temperature compatible with the use of conventional electrical insulators, so it must be provided with a cooling circuit (not shown). Generally, water cooling is used. However, cooling by circulation of gas (for example air) could also be used when the power of the asynchronous motor does not justify the complication introduced by cooling with water.

The rotor winding 127 is connected to rings 134 (three or four for a three phase winding) enabling either the different phases from the rotor winding to be delivered into rheostats or to place three phases in short circuit, or to supply the three phases by a low frequency three phase electric generator (not shown), so as to ensure in the latter case hypersynchronous operation. The use of rheostats, in particular for starting up of the motor, is quite similar to that of conventional wound rotor asynchronous motors.

The stator winding 111 is constituted by a three phase bipolar winding distributed, produced in conventional manner of an electrically good conducting material (copper or aluminum) vigorously cooled, for example by the forced circulation of water. The conductors must be subdivided and transposed to minimize eddy current losses.

In the embodiment shown in FIG. 10, the stator winding 111 is placed in the notches of a stator support which can be either an insulating material reinforced by fibers, or a magnetic or amagnetic steel. In the latter case this stator support is sheeted in planes perpendicular to the axis of the machine to avoid losses. The distribution and insulation of the conductors in the notches will not be further described, since it relates to a known technology and already used in the manufacture of stators or of conventional alternators.

The starting up of the asynchronous motor thus produced must be effected in two phases: in a first phase, the main shaft 114 being stopped and the rotor windings in open circuit, the inductor is launched so as to "engage" the rotary field produced by the stator. This may be done by means of an auxiliary synchronised asynchronous motor of very low power, coupled mechanically to the inductor shaft 135. When synchronism is reached, the stator winding 111 and the supply network are coupled.

In a second phase, the rotor winding 127 is closed on the starting rheostats. The principal shaft 114 starts to rotate; this starting up is effected under load.

For the starting up which has just been described, the current may be started in the inductor winding before the placing in rotation of the inductor. It could also be envisaged, without this solution appearing advantageous, to use the electromagnetic screen of the inductor (outer wall of the cryostat) to effect "asynchronous" starting up of the inductor, the stator being supplied at very low voltage. The current would than only be launched in the inductor winding when the inductor rotates at a speed close to synchronism.

The invention is obviously not limited to the particular embodiments which have been shown and described by way of examples and it must be understood that the scope of the present patent extends to all modifications within the category of equivalents.

We claim:

1. An asynchronous rotary electrical machine comprising, in combination: a stator having a normally conducting polyphase winding for providing a rotating field when electric currents circulate therein; a superconducting field winding located in a cryostat enclosure and mounted for rotation within said stator in synchronism with the rotating field of said stator; and a mechanical torque transmission shaft, rotatable with respect to said stator and said field winding, which shaft is purely electromagnetically coupled to said field winding and includes an annular portion located between said field winding and stator winding, said torque transmission shaft comprising a hollow cylinder of high mechanical resistance and low electric conductivity material internally lined with a high electrical conductivity material, said cylinder having internal longitudinal projections which hold the lining and said lining comprising a material selected from the group consisting of copper,, aluminum, aluminum base light alloys and zirconium base alloys.

2. Rotary machine according to claim 1, comprising a closed circuit for cooling the tubular shaft, said circuit comprising means for injecting into the shaft water which forms a film against the inner wall when the shaft rotates, means for collecting the steam or the steam-water spray formed by boiling of the water in contact with the shaft, and means for cooling the water before reinjecting it into the shaft.

3. Machine according to claim 2, wherein the water cooling means are constituted by a heat exchanger with water supply from a boiler for the production of steam for driving a turbine coupled to the machine.

4. Machine according to claim 1, wherein the cryostat is constituted by an annular enclosure bounded by two metallic envelopes, the inner envelope being constituted in sufficiently strong manner to serve as a hoop for the field winding.

5. Machine according to claim 4, wherein the cryostat is extended axially by channeled or ribbed flanges, fixed to a central tube rotating in bearings mounted in the shaft and placed at an axial distance from the winding sufficient for the magnetic field therein to be weak.

6. Machine according to claim 5 wherein said flanges comprise channeled flanges.

7. Machine according to claim 5 wherein said flanges comprise ribbed flanges.

8. Machine according to claim 1, wherein the shaft is borne by end bearings placed at an axial distance from the field coil for the electromagnetic field in the bearings to be a small fraction of the field around said coil.

9. Machine according to claim 8, wherein the tubular shaft is forged in a single part with a solid extension of small diameter, for coupling with a drive turbine.

10. Machine according to claim 1, wherein the field winding is constituted of a plurality of layers, which extend parallel to the axis of the machine, of superconducting wire, which layers are hooped by spirally wound steel wires.

11. Machine according to claim 1, wherein the stator is constituted by electrical conductors insulated from one another, the diameter of each conductor being much smaller than skin depth at the working frequency and said conductors being transposed to avoid circulation currents and used in parallel.

12. Machine according to claim 11, wherein the conductors are twisted into groups containing between 17 and 150 wires, each group constituting a single conductor wound in conventional manner to constitute a stator winding.

13. Machine according to claim 1, comprising a screen arranged around stator of the machine at a distance therefrom at least equal to five times the radius of said field coil.

14. An asynchronous rotary electrical machine comprising, in combination: a stator having a polyphase normally conducting winding which comprises cylinders disposed in parallel to the axis and distributed angularly; a superconducting field winding located in a cryostat enclosure and mounted for rotation within said stator in synchronism with the rotating field of said stator; and a mechanical torque transmission shaft rotatable with respect to said stator and said field winding, and formed with electrically conducting means in a portion thereof located between said stator and said field winding; the arrangement of said cylinders of said stator winding being such that they encompass substantially the whole flux of the field winding, each cylinder being constituted so as to compensate for the third harmonic of the inductance reaction field at half the depth of penetration in said electrically conducting portion of the rotary shaft.

15. Machine according to claim 14, further comprising compensating conductors mounted in series opposition with the cylinders of the stator, and disposed between the cylinders and the rotary shaft.

16. Machine according to claim 14, wherein each cylinder comprises, over its whole length, a portion devoid of conductors close to the rotary shaft.

17. Asynchronous rotary electric machine comprising, in combination: a stator having a normally conducting polyphase winding for providing a rotating field when electric currents circulate therein; a superconducting field winding located in a cryostat enclosure and mounted for rotation within said stator in synchronism with the rotating field of said stator; and a mechanical torque transmission shaft rotatable with respect to said stator and said field winding and formed with an annular portion located between said stator winding and field winding, said portion carrying a polyphase winding cooled by circulation of a fluid and connected to sliding external contacts for exchanging electric power with an external circuit.

18. Electrical machine according to claim 17, wherein means connected to the sliding contacts enable the extraction of electrical power from the field winding and to supply it to it.

19. Electrical machine according to claim 17, wherein the outer wall of the cryostat is of a good electrically conducting material to constitute a damping screen for interfering fields produced by the winding of the stator.

20. Electrical machine according to claim 17, wherein the shaft is of electrically conducting material and is laminated perpendicular to its axis of rotation.

21. Machine according to claim 19 comprising means for supplying an energizing current to the field coil during the period of starting up of the machine until it operates at under steady state conditions.

22. Electrical machine according to claim 21, wherein the means supplying an energizing current are constituted by a direct current generator outside the machine, connected to the latter by sliding contacts.

23. Electrical machine according to claim 22, comprising a superconducting switch provided with actuating means to close the switch and to short circuit the field coil on itself at steady speed.

24. Electrical machine according to claim 17 wherein the shaft is fabricated of insulating material at least in the portion thereof subjected to a field rotating at the slip frequency of said shaft with respect to the field winding.

25. Electrical machine according to claim 10 wherein said layer is separated from the spirally wound steel wires which hoop it by a sheet of electrically insulating material formed with apertures for circulation of cooling liquid.

* * * * *